United States Patent
Lee

(12) 
(10) Patent No.: US 6,594,444 B2
(45) Date of Patent: *Jul. 15, 2003

(54) DIGITAL VIDEO PLAYBACK APPARATUS AND METHOD

(75) Inventor: Hee-Soo Lee, Ahnsan (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/958,914

(22) Filed: Oct. 28, 1997

(65) Prior Publication Data

US 2001/0022887 A1 Sep. 20, 2001

(30) Foreign Application Priority Data

Nov. 28, 1996 (KR) ......................................... 1996-58962

(51) Int. Cl.[7] .............................. H04N 5/91; H04N 5/76
(52) U.S. Cl. ....................................... 386/108; 386/125
(58) Field of Search ........................ 386/1, 33, 38–40, 386/45, 108, 95, 125–126; 348/705–706, 558, 235, 423; 370/465, 468, 542; 369/47, 54, 48, 49

(56) References Cited

U.S. PATENT DOCUMENTS

| | | | |
|---|---|---|---|
| 4,954,880 A | * 9/1990 | Tanimizu | 348/500 |
| 5,199,030 A | * 3/1993 | Ueda | 370/68 |
| 5,237,426 A | 8/1993 | Daito | 358/342 |
| 5,267,039 A | 11/1993 | Elberbaum | 358/146 |
| 5,471,316 A | 11/1995 | Sugawara et al. | 358/342 |
| 5,768,399 A | * 6/1998 | Statham et al. | 381/420 |
| 5,790,177 A | * 8/1998 | Kassatly | 348/13 |
| 5,819,003 A | * 10/1998 | Hirayama | 386/95 |
| 5,933,398 A | * 8/1999 | Fujinami | 369/49 |
| 5,999,698 A | * 12/1999 | Nakai et al. | 386/125 |
| 6,430,361 B2 | * 8/2002 | Lee | 386/98 |

FOREIGN PATENT DOCUMENTS

EP        0 677 842 A1    10/1995

* cited by examiner

Primary Examiner—Thai Tran
(74) Attorney, Agent, or Firm—Staas & Halsey LLP

(57) ABSTRACT

A digital video playback apparatus which selectively reproduces video signals that are recorded by using a plurality of cameras each at different angles and method therefor. The digital video playback apparatus reads out first and second video stream data and first and second audio stream data, which are compressed and recorded on a recording medium. A demultiplexer separates a signal output of the digital playback apparatus into system information, the first and second video stream data, and the first and second audio stream data. First and second video decoders expand the first and second compressed video stream data outputs, respectively. First and second audio decoders decode the first and second audio stream data outputs from the demultiplexer and expand the first and second audio stream data decoded into original 4-channel audio signals, respectively. A key input section generates first and second angle selection signals. A controller analyzes the system information, and generates a switching control signal. First and second switches selects the first and second video and audio stream data according to the switching control signal.

21 Claims, 5 Drawing Sheets

DIGITAL VIDEO PLAYBACK APPARATUS AND METHOD

BACKGROUND OF THE INVENTION

1. Field of the Invention

The present invention relates to a digital video playback apparatus in a digital video device and method therefor, and more particularly, to a digital video playback apparatus for playing-back the video and audio signals that have been recorded by a plurality of cameras at different angles and method therefor.

2. Description of the Related Art

As illustrated in FIG. 1, in the case of taking a motion picture or a music video, a camera is set in front of an object and four microphones SL (Surround Left), SR (Surround Right), FL (Front Left), and FR (Front Right) are set surrounding the object to secure the presence of the sounds. The audio and video signals from the camera and the microphones are recorded, on a recording medium such as a disc, by a known video recorder illustrated in FIG. 2.

Referring to FIG. 2, a multiplexer (MUX) 14 receives system information which includes the number of video blocks, the number of audio blocks, a start address for each video block, and a start address for each audio block. A video encoder 10 converts an analog video signal input into digital video data, and formats the digital video data in a predetermined manner. The video data output from the video encoder 10 are applied to the multiplexer 14. An audio encoder 12 converts the 4-channel analog audio signals FL, FR, SL and SR from the microphones into digital audio data, and formats the digital audio data in a predetermined manner. The audio data output from the audio encoder 12 are transferred to the multiplexer 14. As illustrated in FIG. 3, the multiplexer 14 generates by turn the system information, the video data, and the audio data. A digital recorder 16 records, by turn, the system information, the video data, and the audio data on the recording medium.

FIG. 4 illustrates a conventional video playback apparatus for playing-back the audio and video data recorded as shown in FIG. 3. As illustrated, a digital playback apparatus 20 reads out video and audio data which are compressed and recorded on the recording medium such as a disc. The read video and audio data undergo an error correction and deinterleaving process. A demultiplexer (DMUX) 22 separates a signal output of the digital playback apparatus 20 into the system information, the video data, and the audio data. A video decoder 24 decodes compressed video stream data output from the demultiplexer 22, to expand the compressed video stream data into the original video signal. The video decoder 24 may be realized by a chip CL480 or CL9100 manufactured by C-Cube Co. An NTSC (National Television System Committee) encoder 26 encodes a video signal output from the video decoder 24 into an NTSC video signal. The NTSC encoder 26 may be realized by a chip CXA1145P manufactured by Sony Co., or a chip KA2194D manufactured by Samsung Electronics Co. An audio decoder 28 decodes the compressed audio stream data output from the demultiplexer 22, to expand the compressed audio stream data into the 4-channel audio data. A digital-to-analog converter and amplifier 29 converts the expanded 4-channel audio data from the audio decoder 28 into the original 4-channel analog audio signals RL, FR, SL and SR, and amplifies the converted 4-channel analog audio signals. However, since such a video playback apparatus reproduces the video signal from only one camera, it is not possible to reproduce a video signal from another camera at a different angle.

SUMMARY OF THE INVENTION

It is therefore an object of the present invention to provide a digital video playback apparatus capable of selectively reproducing video signals which are recorded by using a plurality of cameras each at different angles.

Additional objects and advantages of the invention will be set forth in part in the description which follows and, in part, will be obvious from the description, or may be learned by practice of the invention.

The above and other objects of the present invention are achieved by providing a digital video playback apparatus which includes a digital playback apparatus to read out first and second video stream data and first and second audio stream data, which are compressed and recorded on a recording medium, the first and second video and audio stream data undergoing an error correction and deinterleaving process; a demultiplexer to separate a signal output of the digital playback apparatus into system information, the first and second video stream data, and the first and second audio stream data; first and second video decoders to expand the first and second compressed video stream data outputs from the demultiplexer, respectively; first and second audio decoders to respectively decode the first and second audio stream data outputs from the demultiplexer and to expand the first and second audio stream data decoded into original 4-channel audio signals, respectively; a key input section to generate first and second angle selection signals; a controller to analyze the system information from the demultiplexer and the angle selection signals from the key input section, to generate a switching control signal; and first and second switches to select the first and second video stream data from the first and second video decoders and the first and second audio stream data from the first and second audio decoders according to the switching control signal.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENT

A preferred embodiment of the present invention will be described in detail hereinbelow with reference to the attached drawings.

Figure 1:
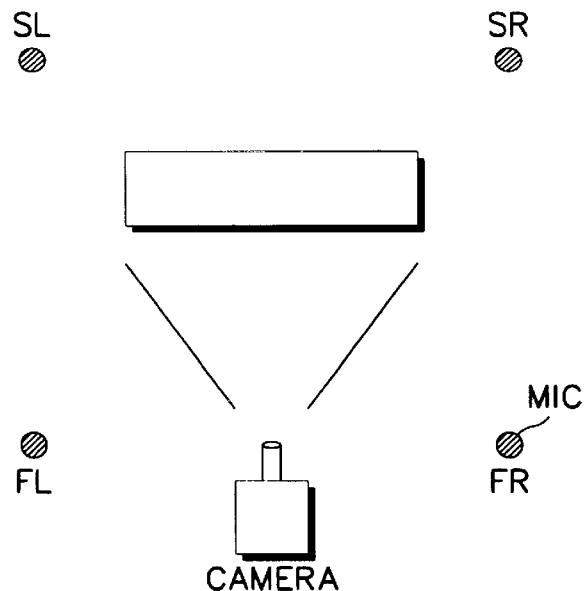
FIG. 1 is a schematic diagram for showing an arrangement of a camera and microphones in a conventional telerecording (video and audio data) recording system.
Figure 2:
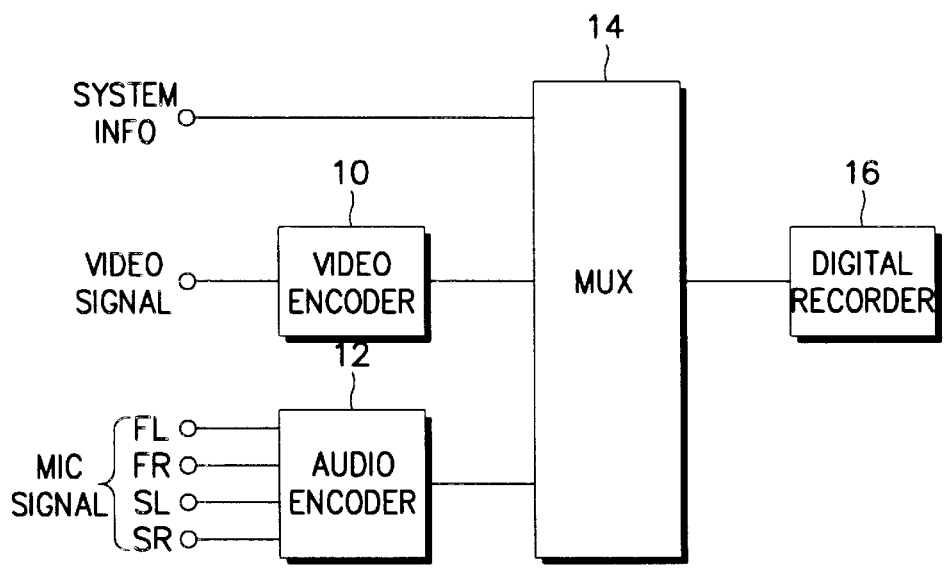
FIG. 2 is a block diagram of a conventional video recording apparatus to record video and audio data in accordance with the system shown in FIG. 1.
Figure 3:
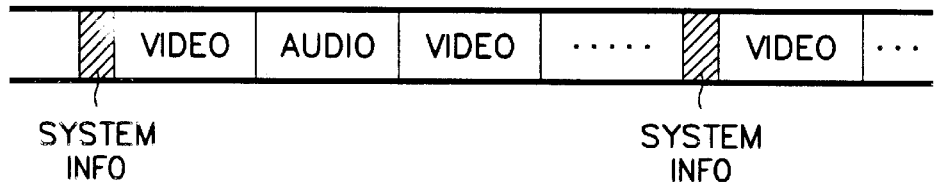
FIG. 3 is a diagram for showing a data stream recorded on a recording medium according to the conventional video recording apparatus shown in FIG. 2.
Figure 4:
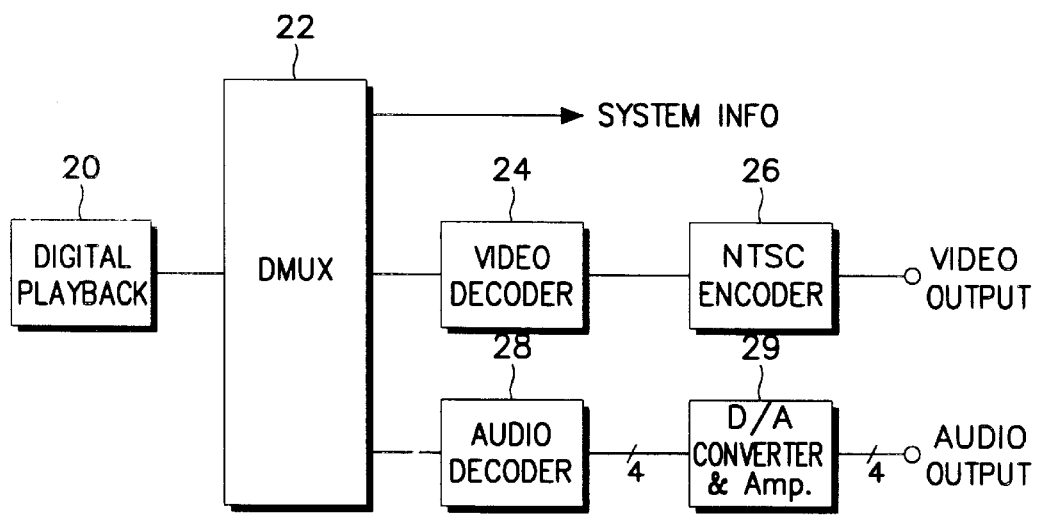
FIG. 4 is a block diagram of a conventional video playback apparatus in accordance with the system shown in FIG. 1.
Figure 5:
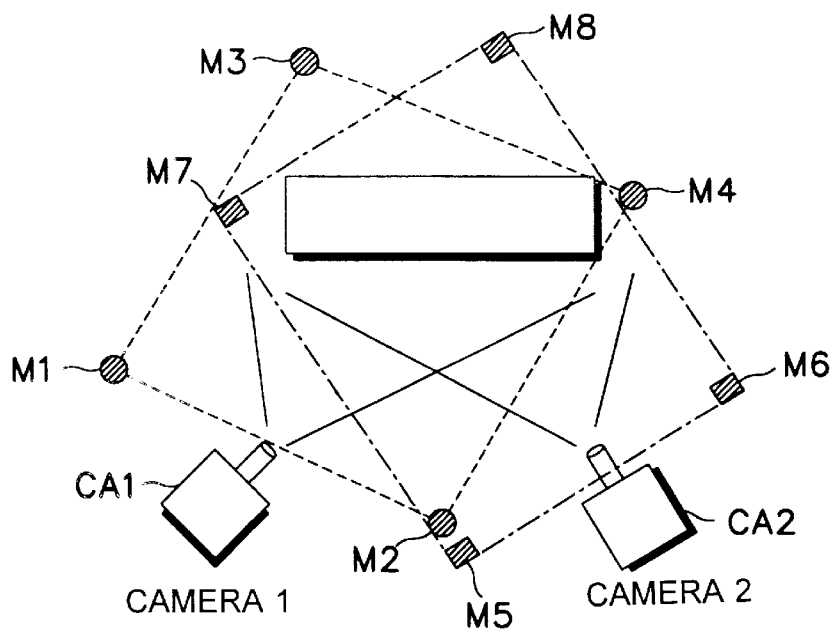
FIG. 5 is a schematic diagram for showing an arrangement of cameras and microphones in a telerecording system according to an embodiment of the present invention.

Referring to FIG. 5, a telerecording system according to an embodiment of the present invention includes at least two cameras CA1 and CA2 at different angles. The first camera CA1 includes four microphones M1–M4, and the second camera CA2 includes four microphones M5–M8. It should be understood that the number of cameras may be freely varied at the user's discretion.

Figure 6:
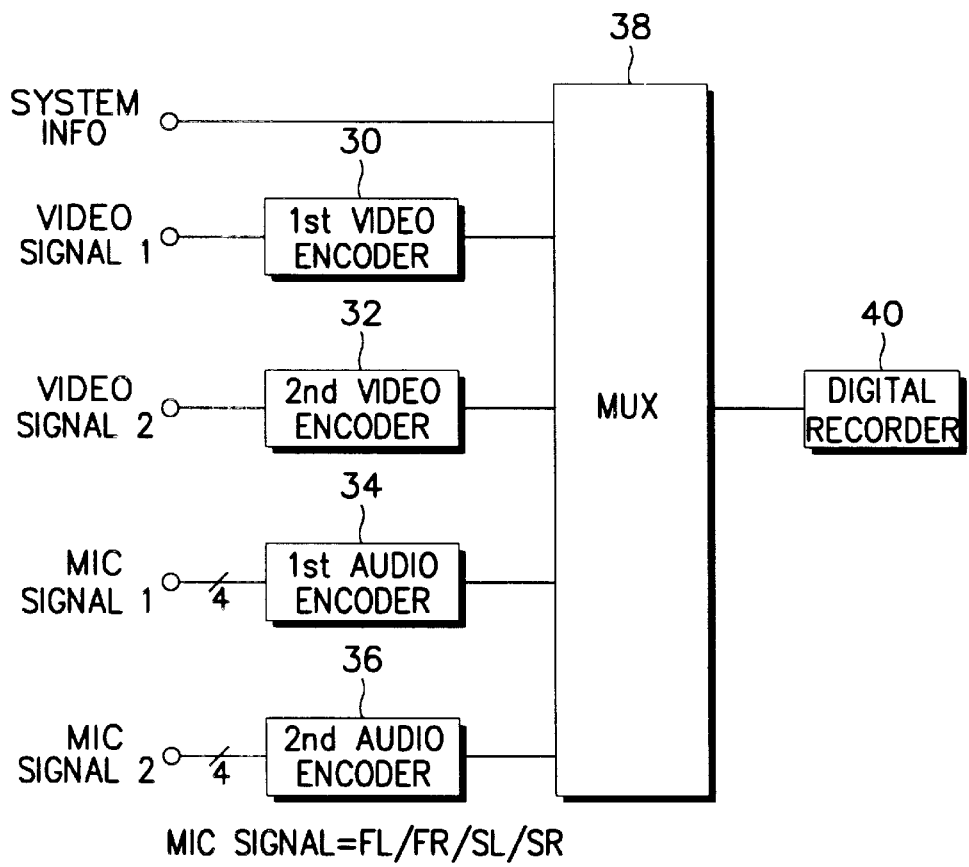
FIG. 6 is a block diagram of a video recording apparatus according to the embodiment of the present invention.

Referring to FIG. 6, a video recording apparatus according to the embodiment of the present invention includes first and second video encoders 30 and 32, first and second audio encoders 34 and 36, a multiplexer 38, and a digital recorder 40.

Figure 7:
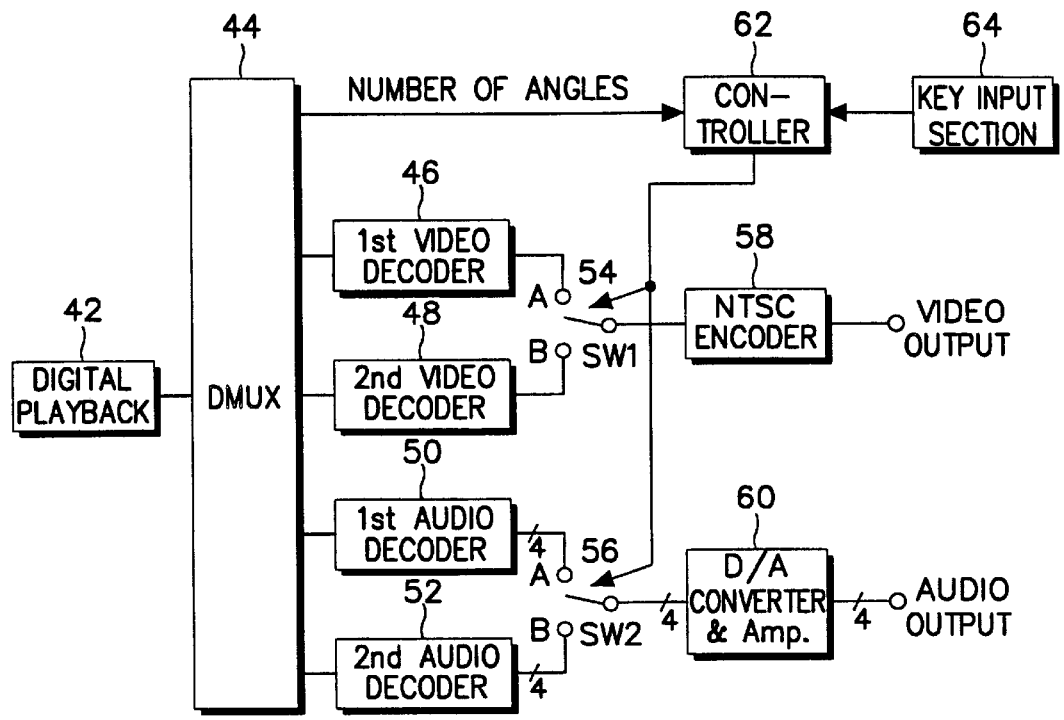
FIG. 7 is a block diagram of a video playback apparatus according to the embodiment of the present invention.

Referring to FIG. 7, a video playback apparatus according to the embodiment of the present invention includes a digital playback apparatus 42 for reading out first and second video stream data, and first and second audio stream data, which are compressed and recorded on a recording medium. The read video and audio stream data undergo an error correction and deinterleaving process. A demultiplexer 44 separates a signal output of the digital playback apparatus 42 into the system information, the first and second video stream data, and the first and second audio stream data. First and second video decoders 46 and 48 expand the first and second compressed video stream data from the demultiplexer 44, respectively. First and second audio decoders 50 and 52 decode the first and second compressed audio stream data from the demultiplexer 44 respectively, to expand the audio stream data into the 4-channel audio data. A key input section 64 includes first and second angle selection keys to generate first and second angle selection signals. A controller 62 analyzes the system information generated from the demultiplexer 44. Further, the controller 62 generates a switching control signal according to the first and second angle selection signals generated from the key input section 64. A first switch 54 selects one of the first and second video data from the first and second video decoders 46 and 48 according to the switching control signal. Similarly, a second switch 56 selects one of the first and second audio data from the first and second audio decoders 50 and 52 according to the switching control signal. An NTSC encoder 58 encodes the video data selected by the first switch 54 into an NTSC video signal. The NTSC encoder 58 may be realized by a chip CXA1145P manufactured by Sony Co., or a chip KA2194D manufactured by Samsung Electronics Co. A digital-to-analog converter and amplifier 60 converts the audio stream data selected by the second switch 56 into the original 4-channel analog audio signals, and amplifies the 4-channel analog audio signals.

Figure 8:
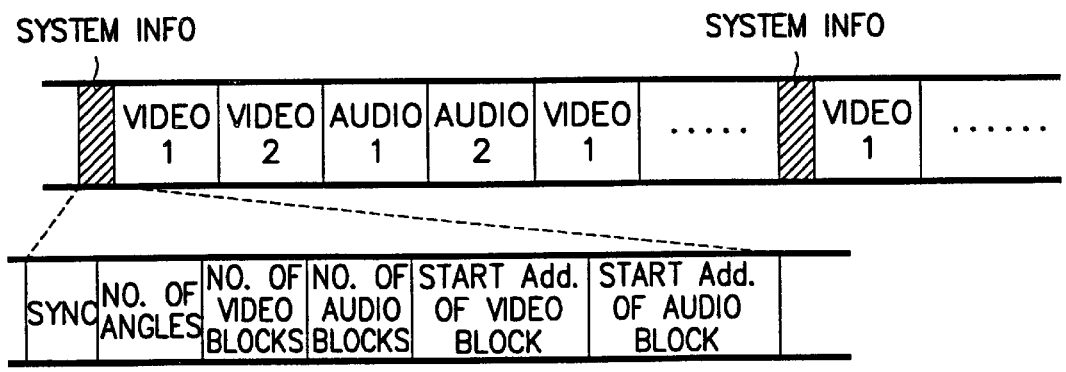
FIG. 8 is a diagram for showing a data stream recorded on a recording medium according to the embodiment of the present invention.

FIG. 8 illustrates the data stream recorded on a recording medium according to an embodiment of the present invention, in which the system information, the first and second video data, and the first and second audio data are arranged in order. The system information according to the present invention includes synchronization data, the number of angles, the number of video blocks, the number of audio blocks, a start address for each video block, and a start address for each audio block.

Now, referring to FIGS. 5 through 9, a detailed description will be made of the operation of the preferred embodiment of the invention. The multiplexer 38 receives the system information shown in FIG. 8. The first video encoder 30 converts an analog video signal output from the first camera CA1 into digital video data, and formats the digital video data in a predetermined manner. The second video encoder 32 converts an analog video signal output from the second camera CA2 into digital video data, and formats the digital video data in a predetermined manner. The first audio encoder 34 converts 4-channel audio signals FL1, FR1, SL1, and SR1 from the microphones M1–M4 into digital audio data, and formats the digital audio data in a predetermined manner. The second audio encoder 36 converts 4-channel audio signals FL2, FR2, SL2, and SR2 from the microphones M5–M8 into digital audio data, and formats the digital audio data in a predetermined manner. The multiplexer 38 sequentially generates the system information, the first and second video data, and the first and second audio data, as shown in FIG. 8. The digital recorder 40 sequentially records the system information, the first and second video data, and the first and second audio data, from the multiplexer 38.

Referring to FIG. 7, the digital playback apparatus 42 reads out the first and second video data and the first and second audio data, which are compressed and recorded on the recording medium such as a disc. The read video and audio data undergo an error correction and deinterleaving process. The demultiplexer 44 separates a signal output of the digital playback apparatus 42 into the system information, the first and second video data, and the first and second audio data. The first video decoder 46 expands the first compressed video data output from the demultiplexer 44. The second video decoder 48 expands the second compressed video data output from the demultiplexer 44. The first and second video decoders 46 and 48 may be realized by a chip CL480 or a chip CL9100 manufactured by C-Cube Co. The first audio decoder 50 decodes the compressed first audio stream data output from the demultiplexer 44, to expand the compressed first audio stream data into the first 4-channel audio data. Similarly, the second audio decoder 52 decodes the compressed second audio stream data output from the demultiplexer 44, to expand the compressed second audio stream data into the second 4-channel audio data.

Figure 9:
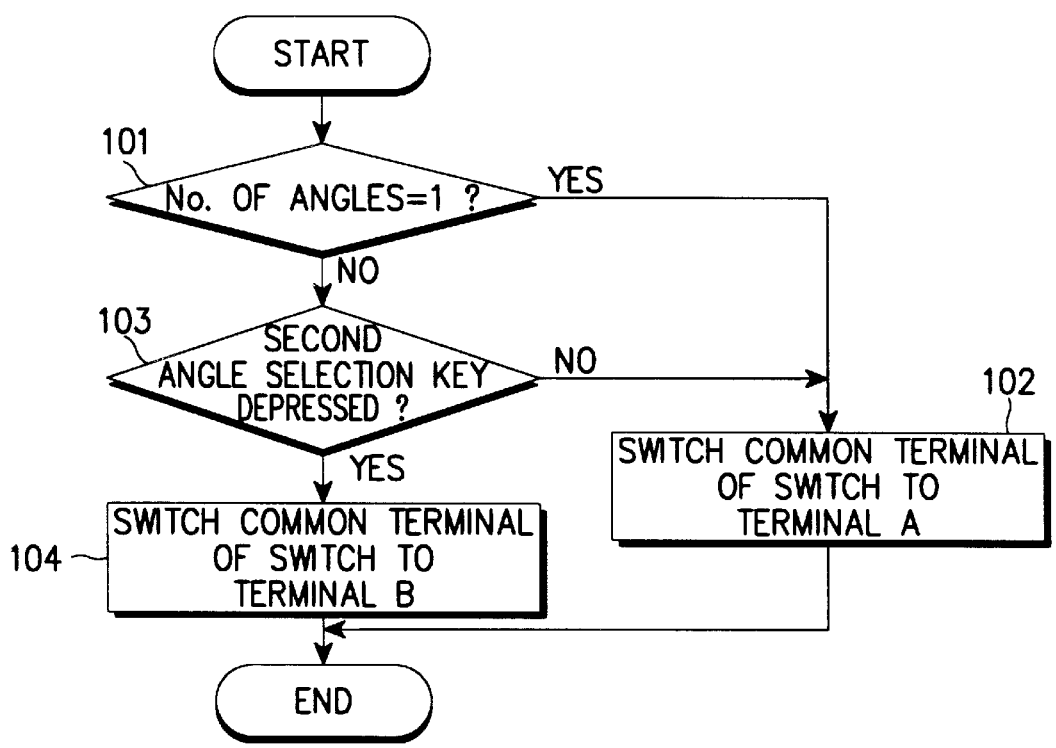
FIG. 9 is a flow chart for selectively reproducing video signals from a plurality of cameras at different angles according to the embodiment of the present invention.

At the moment, if a user depresses the first or second angle selection key prepared on the key input section 64 to generate the first or second angle selection signal, the controller 62 generates the switching control signal to control the first and second switches 54 and 56. With reference to FIG. 9, the controller 62 analyzes, at a step 101, the system information and checks whether the number of angles is one or not. If the number of the angles is one, the controller 62 generates the switching control signal of a first logic state to switch respective common terminals of the first and second switches 54 and 56 to respective terminals "A" thereof, at a step 102. Then, the first video stream data output from the first video decoder 46 is transferred to the NTSC encoder 58. The NTSC encoder 58 encodes a video signal output from the first video decoder 46 into an NTSC video signal. Further, the first audio stream data output from the first audio decoder 50 is transferred to the digital-to-analog converter and amplifier 60. The digital-to-analog converter and amplifier 60 converts the audio-stream data generated from the first audio decoder 50 into the 4-channel analog audio signals, and amplifies the converted 4-channel analog audio signals. However, if the number of the angles is not one at the step 101, the controller 62 will check at a step 103 whether or not the user has depressed the second angle selection key of the key input section 64. If the first angle selection key is depressed, the process proceeds to step 102 and this step is performed as set forth above. If the second angle selection key is depressed, the controller 62 generates the switching control signal of a second logic state to switch the common terminals of the first and second switches 54 and 56 to terminals "B" thereof, at a step 104. Then, the second video stream data output from the second video decoder 48 is transferred to the NTSC encoder 58. Further, the second audio stream data output from the second audio decoder 52 is transferred to the digital-to-analog converter and amplifier 60. Therefore, the video playback apparatus reproduces the second video stream data and second audio stream data from the second video decoder 48 and the second audio decoder 52, respectively.

As can be appreciated from the foregoing descriptions, the video playback apparatus of the present invention can selectively reproduce video signals which are recorded on a recording medium by using a plurality of cameras each at different angles. Thus, the user may selectively watch the videos at different angles, together with the associated real sounds.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A digital video playback apparatus to read out video stream data and audio stream data which are compressed and recorded on a recording medium, the digital video playback apparatus comprising:
    a digital playback apparatus to read out the compressed video stream data and the compressed audio stream data from the recording medium, and to error correct and deinterleave the video and audio stream data;
    a demultiplexer to separate a signal output of said digital playback apparatus into system information, indicating number of different angles, the compressed video stream data recorded from the different angles, and the compressed audio stream data recorded from the different angles;
    a plurality of video decoders to respectively in parallel expand the compressed video stream data recorded from the plurality of different angles from said demultiplexer;
    a plurality of audio decoders to respectively in parallel decode the compressed audio stream data recorded from the plurality of different angles from said demultiplexer and to respectively in parallel expand the decoded audio stream data into original 4-channel audio data;
    a key input section to generate based upon the number of angles a plurality of angle selection signals indicative of the corresponding angles;
    a controller to generate a switching control signal indicative of the video data stream from one of the plurality of video decoders and the audio stream from one of the plurality of audio decoders in response to one of the plurality of angle selection signals selected by a user at said key input section; and
    a plurality of switches to select the video stream data from the one of the plurality of video decoders and the audio stream data from the one of the plurality of audio decoders, according to said switching control signal.

2. A digital video playback apparatus according to claim 1, wherein said system information further comprises for the different angles a number of video blocks, a number of audio blocks, a start address for each video block, and a start address for each audio block.

3. A digital video playback apparatus to read out first and second video stream data and first and second audio stream data which are compressed and recorded on a recording medium, the digital video playback apparatus comprising:
    a digital playback apparatus to read out the first and second video steam data and the first and second audio stream data from the recording medium, and to error correct and deinterleave the first and second video and audio stream data;
    a demultiplexer to separate a signal output of said digital playback apparatus into system information, indicating two different angles, the compressed first and second video stream data from the two different angles, and the compressed first and second audio stream data form the two different angles;
    first and second video decoders to expand the first and second compressed video stream data outputs from said demultiplexer, respectively in parallel;
    first and second audio decoders to decode the first and second audio stream data outputs from said demultiplexer, and to expand the first and second audio stream data decoded into original 4-channel audio signals, respectively in parallel;
    a key input section to generate first and second angle selection signals corresponding to the two different angles;
    a controller to generate a switching control signal indicative of one of the first and second video stream data from said first and second decoders, respectively, and one of the first and second audio stream data from said first and second audio decoders, respectively, in response to one of the first and second angle selection signals selected by a user at said key input section; and
    a first switch to select one of the first and second video stream data from said first and second video decoders, respectively, and a second switch to select one of the first and second audio stream data from said first and second audio decoders, respectively, according to said switching control signal.

4. A digital video playback apparatus according to claim 3, wherein said system information further comprises for the two different angles a number of video blocks, a number of audio blocks, a start address for each video block, and a start address for each audio block.

5. A digital video playback apparatus to reproduce a digital data stream recorded on a recording medium, wherein the data stream includes data recorded from a plurality of different angles, the digital video playback apparatus comprising:
    a digital playback device to read out the data stream from the recording medium;
    a demultiplexer to separate system information, indicating number of different angles of the read out data stream; and
    a reproducer using the system information to decode respectively in parallel the data of each different angle and to reproduce the data of one of the different angles based upon a selection indicator from a user indicating one of the different angles.

6. A digital video playback apparatus as claimed in claim 5, wherein the data stream is video and audio data from the different angles; and said digital playback device error corrects and deinterleaves the data stream; and said reproducer decodes depending on the number of the angles in parallel the video and audio data of each different angle and reproduces the video and corresponding audio data of one of the angles based upon the selection indicator.

7. A digital video playback apparatus to reproduce a digital data stream recorded on a recording medium, wherein the data stream includes system information, video data and corresponding audio data recorded from a plurality of different angles, the digital video playback apparatus comprising:

a digital playback device to read out the data stream from the recording medium; and a reproducer reproducing the data of one of the angles based upon a selection indicator from a user indicating one of the different angles, wherein said reproducer includes a processing unit to separate the system information, video data and audio data of each of the different angles, and to decode according to the system information indicating number of the different angles respectively in parallel the video data and the audio data of each different angle, and a selector unit to output the decoded video data and corresponding audio data of one of the different angles based upon the selection indicator.

8. A digital video playback apparatus as claimed in claim 7, wherein the video and audio data are compressed as recorded on the recording medium, and said processing unit further comprises:

a demultiplexer to separate the system information, video data and audio data of each of the plurality of different angles from each other;

a plurality of video decoders to expand the compressed video data for each of the plurality of different angles, respectively in parallel; and a plurality of audio decoders to expand the compressed audio data for each of the plurality of different angles, respectively in parallel.

9. A digital video playback apparatus as claimed in claim 7, wherein said selector unit comprises:

a key input selector to generate an angle selection signal based upon the selection indicator by the user of the one of the angles;

a controller to generate a switching control signal based upon the angle selection signal;

a first switch to selectively transmit the decoded video data of the one of the angles, based upon the angle selection signal; and a second switch to selectively transmit the decoded audio data of the one of the angles, based upon the angle selection signal.

10. A digital video playback apparatus as claimed in claim 8, wherein said selector unit comprises:

a key input selector to generate an angle selection signal based upon the selection indicator by the user of the one of the angles;

a controller to generate a switching control signal based upon the angle selection signal;

a first switch connected to each of the plurality of video decoders, to selectively transmit the decoded video data of the one of the angles, based upon the angle selection signal; and a second switch connected to each of the plurality of audio decoders, to selectively transmit the decoded audio data of the one of the angles, based upon the angle selection signal.

11. A digital video playback apparatus as claimed in claim 8, wherein:

said demultiplexer outputs the number of the angles of the video and audio data from the system information; and said selector unit includes a key input selector to generate an angle selection signal based upon the selection indicator by the user of the one of the angles, a controller to generate a switching control signal based upon the number of the angles and the angle selection signal, a first switch connected to each of the plurality of video decoders, to selectively transmit the decoded video data of the one of the angles based upon the switching control signal, and a second switch connected to each of the plurality of audio decoders, to selectively transmit the decoded audio data of the one of the angles based upon the switching control signal;

said controller generating the switching control signal to automatically cause the first and second switches to be in a given state to transmit the video and audio data of a particular angle if the number of angles is one, and otherwise generating the switching control signal to cause the first and second switches to transmit the video and audio data of the one angle based upon the angle selection signal.

12. A digital video playback apparatus as claimed in claim 7, wherein the data stream recorded on the recording medium includes the system information, the video data for each of the plurality of different angles and the audio data for each of the plurality of different angles in that order, and said digital playback device reads out the data stream from the recording medium in that order.

13. A digital video playback apparatus as claimed in claim 8, wherein the data stream recorded on the recording medium includes the system information, the video data for each of the plurality of different angles and the audio data for each of the plurality of different angles in that order, and said digital playback device reads out the data stream from the recording medium in that order.

14. A digital video playback apparatus as claimed in claim 8, wherein each of the plurality of audio decoders expands the compressed audio data to 4-channel audio data.

15. A digital video recording apparatus to record a digital data stream of data from a plurality of different angles on a recording medium, the digital video recording apparatus comprising:

a data stream generator encoding respectively in parallel the data of each of the plurality of different angles to generate the data stream from the data received from the plurality of different angles;

a multiplexer generating system information corresponding to the data stream, the system information comprising a number of the angles; and a digital recording device to record the data stream on the recording medium.

16. A digital video recording apparatus as claimed in claim 15, wherein said data stream generator comprises:

a plurality of video encoders and a plurality of audio encoders, wherein each of the plurality of video encoders respectively in parallel receives and encodes the video data of a respective one of the plurality of different angles, and each of the plurality of audio encoders respectively in parallel receives and encodes the audio data of a respective one of the plurality of different angles.

17. A digital video recording apparatus as claimed in claim 16, wherein said multiplexer arranges the data stream in the order of the system information, the video data for each of the plurality of different angles and the audio data for each of the plurality of different angles.

18. A digital video recording apparatus as claimed in claim 16, wherein each of the plurality of audio encoders changes the audio data of the corresponding different angles from 4-channel audio data to a single audio data stream.

19. A method of reproducing a digital data stream of data from different angles recorded on a recording medium, comprising:

reading the data stream from the recording medium;

separating system information, indicating number of the different angles, and the data for each of the plurality of different angles from each other;

decoding according to the number of the different angles respectively in parallel the data for each different angle; and selecting the data for one of the different angles.

20. A method as claimed in claim 19, wherein selecting the system information comprises:

automatically selecting the data for one angle if the number of the different angles is one, and otherwise selecting the data for one of the different angles based upon an input from a user.

21. A method as claimed in claim 20, wherein the data includes video data and corresponding audio data for each different angle, and the automatic data selection further comprises controlling switches to selectively enable transmission of the video and audio data for the one angle or one of the different angles.

* * * * *